United States Patent
Kovarik

[15] 3,695,233
[45] Oct. 3, 1972

[54] GAME BIRD TRANSPORTING DEVICE
[72] Inventor: Vincent J. Kovarik, Route 2, Imperial, Mo. 63052
[22] Filed: May 4, 1970
[21] Appl. No.: 34,421

[52] U.S. Cl. .......................... 119/19, 220/24, 229/6
[51] Int. Cl. ............................................. A01k 1/02
[58] Field of Search ......... 119/19, 23; 220/4, 20, 24; 229/6, 28, 52, 35

[56] References Cited

UNITED STATES PATENTS

| | | | |
|---|---|---|---|
| 2,709,031 | 5/1955 | Gondek | 229/6 |
| 1,791,956 | 2/1931 | Cowles | 229/6 |
| 1,669,300 | 5/1928 | Hunter | 229/28 |
| 2,258,344 | 10/1941 | Walker | 119/19 |
| 3,108,569 | 10/1963 | Kundikoff | 119/19 |
| 3,306,258 | 2/1967 | Hunt | 119/19 |
| 2,079,458 | 5/1937 | Leichfuss | 220/7 |
| 3,375,808 | 4/1968 | Freeman | 119/19 |
| 2,167,913 | 8/1939 | Shaw | 229/35 |
| 1,993,112 | 3/1935 | Patterson | 119/19 |

*Primary Examiner*—Aldrich F. Medbery
*Attorney*—Polster and Polster

[57] ABSTRACT

Game birds, especially pheasants, are transported in stacked containers, each with a substantially imperforate bottom, a rigid, load-supporting perforate side wall convergently slanted toward the bottom and connected to it, and a load-supporting opaque top, hingedly connected to the side wall.

6 Claims, 2 Drawing Figures

3,695,233

GAME BIRD TRANSPORTING DEVICE

BACKGROUND OF THE INVENTION

In transporting mature game birds such as pheasants, over long distances, for breeding or stocking purposes, there has been a high mortality rate. In conventional containers, the birds are nervous and restless, tend to injure themselves and other birds, and to be suffocated.

One of the objects of this invention is to provide a container for game birds, and a method of transporting game birds in it, which reduce the mortality rate of birds being transported drastically from the rate experienced heretofore with conventional containers and methods.

Another object is to provide such containers which may be stacked safely when filled with birds, and nested compactly when empty.

Still another object is to provide such containers which are simple and inexpensive to manufacture, maintain, and use.

Other objects will become apparent to those skilled in the art in the light of the following description and accompanying drawing.

SUMMARY OF THE INVENTION

In accordance with this invention, generally stated, a container is provided, and game birds are transported in the container as part of a stack of containers, each of which containers has a substantially imperforate bottom, a rigid, load-supporting, perforate side wall convergently slanted toward the bottom and connected to it, and a load-supporting, opaque top, hingedly connected to the side wall. In the preferred embodiment, the top is hinged by means of a piano hinge, the top has downwardly directed ears which, when the top is in closing position, extend along, outboard of, and in engagement with the side wall, whereby to inhibit outward springing of the side wall, and latch means are provided for cooperation with the side wall selectively to hold the top in closed position.

In the method of the use of the containers, pheasants are placed feet down in open containers, the top is closed, and the containers, with the pheasants in them, are stacked at least three deep. Preferably, as full containers are emptied, they are nested with other empties.

DESCRIPTION OF THE PREFERRED EMBODIMENT

Figure 1:
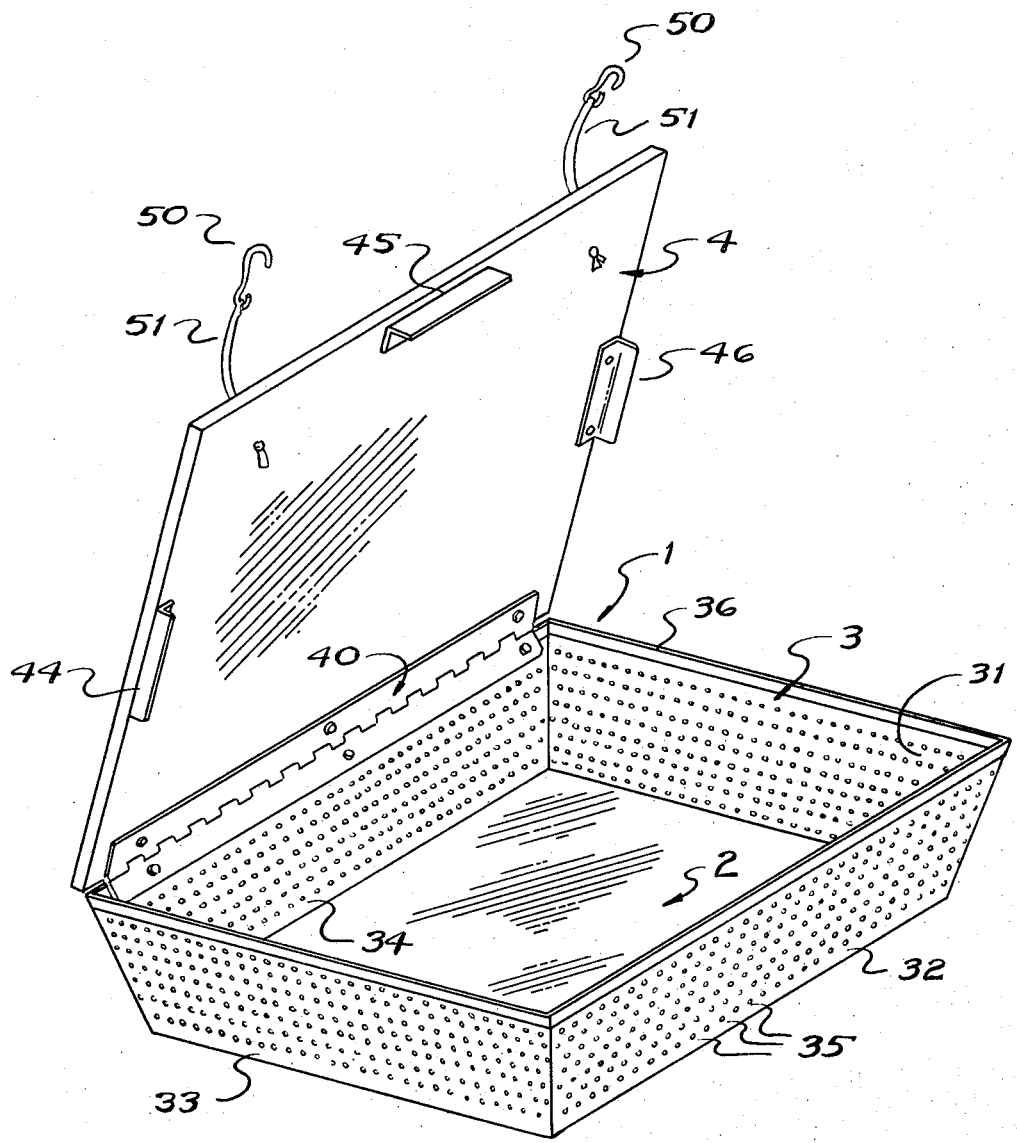
FIG. 1 is a view in perspective of one illustrative embodiment of container of this invention, with the top in raised position.

Referring now to the drawing for one illustrative embodiment of game bird transporting device of this invention, reference numeral 1 indicates a container, rectangular in plan. The container 1 has a bottom 2, of marine or outside plywood or other strong, opaque material, a side wall 3, and a top 4 which can be made of the same material as the bottom.

In the embodiment shown, the bottom 2 is entirely imperforate, and is made of marine plywood. However, any other suitable material can be used, provided that it is strong, resistant to the attrition of bird claws and the chemical action of their droppings, and, preferably, heat insulating at least to the extent of plywood.

The side 3, in the embodiment shown, is made up of four, perforated, trapezoidal panels 31, 32, 33 and 34. Perforations 35 preferably make up approximately one-half of the area of the wall 3. Panels 31, 32, 33 and 34 may be integral except at one meeting edge where they may be welded, brazed, riveted, or otherwise secured, or they may be separate pieces, secured at all four meeting edges, with either an integral flap overlapping an edge of the adjacent panel, or with a separate reinforcing and joining strip on either the inside or outside or both. Other modes of fabrication can be used, but as a practical matter, the ones described are likely to be most satisfactory.

As can be observed from the figures, the trapezoidal form of the panels produces a wall 3 which slopes convergently toward the base 2.

The convergence of the wall 3 toward the base 2 has several functions. It accommodates the bodies of the birds, giving support to the side or breast of the bird against it. It also ensures that the perforations 35 are not blocked by the wall 3 of a container 1 close against it. It also permits nesting of empty containers.

In the embodiment shown, the topmost margin of the side wall 3 is folded over to form a reinforcing band 36. The lower edges of the panels making up the wall 3 are bent inwardly in a common plane parallel to the plane of the open top, to provide flanges, not here shown, upon which the bottom 2 rests and to which the bottom is secured as by screws, rivets, or the like. Preferably, the edges of the bottom 2 are chamfered complementarily to the slope of the panels of the wall 3, so as to insure a tight joint between the bottom and the side wall, but the slope of the side wall makes this largely unnecessary, because the birds cannot easily get their claws into a crack between the bottom and the side wall.

In the embodiment shown, a piano hinge 40 has one leaf riveted to the upper edge of the panel 34, and its other leaf riveted to the top 4 along one of its edges, hingedly mounting the top 4 to the wall 3.

Figure 2:
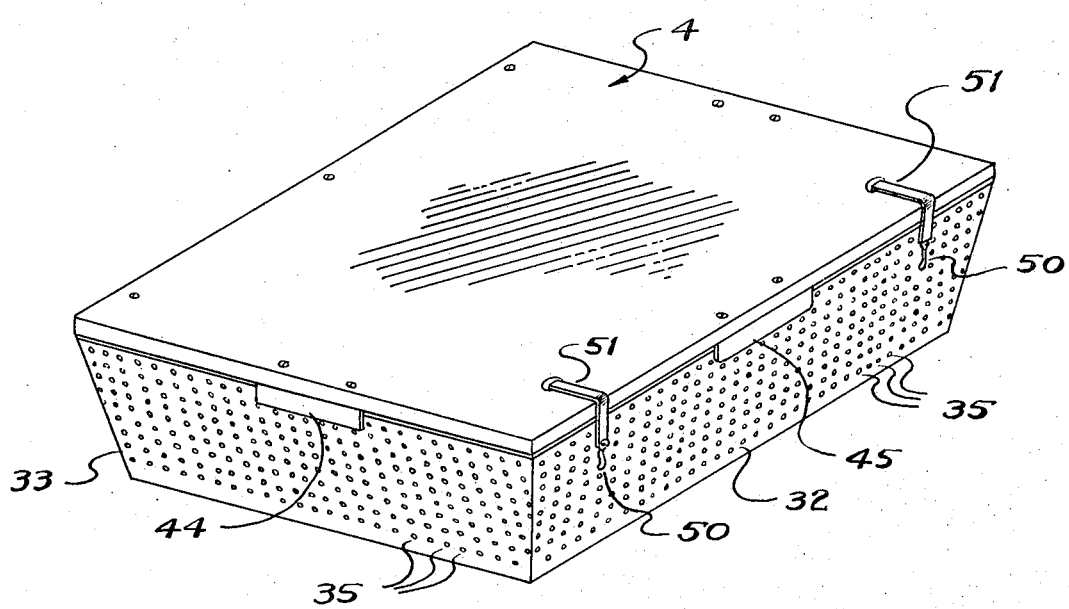
FIG. 2 is a view in perspective of the container shown in FIG. 1, with the top in closed position, and latch means in top-securing position.

The top 4 has L-shaped ears 44, 45 and 46 riveted to its undersurface along the three free edges of the top. A depending part of each ear extends along, outboard of, and in engagement with the corresponding side wall panel when the top 4 is in closed position as shown in FIG. 2. This keeps the side wall from bulging, and ensures that the top is fully supported.

In the embodiment shown, latch means take the form of hooks 50, fastened to elastic bands 51, which in turn, are mounted on the top 4. In FIG. 1 the bands 51 are shown as passing through holes in the top, and being knotted on the underside of the top, to prevent their being pulled through when the hooks are pulled to the position shown in FIG. 2 and hooked into perforations in the panel 32 of the side wall.

In this embodiment, the top 4 must be rigid and strong enough to support containers piled upon it, and the side wall 3 must be rigid and sufficiently load-supporting to bear the weight of at least two and preferably as many as eight or ten full containers stacked vertically.

To this end, merely by way of illustration and not by way of limitation, a commercially acceptable container can be made with the following dimensions and materials:

Side Wall Panels 32 and 34, along top edge: 22 inches
Side Wall Panels 32 and 34, along lower edge: 19 inches
Side Wall Panels 31 and 33, along top edge: 19½ inches
Side Wall Panels 31 and 33, along lower edge: 16¼ inches
Side Wall Height: 7 inches inside
Side Wall Thickness: 18 – 20 guage perforated steel
Bottom: 16½ inches × 19½ inches (along top surface) × ¼ inch
Top: 22¼ inches × 19¾ inches × ¼ inch
Ears: Depending leg: 4 inches × ⅜ inch (18 guage)
Secured leg: 4 inches × 1 inch A container of the dimensions given will accommodate safely eight mature birds at ambient temperatures of below 35° F., or six to seven mature birds at temperatures above 35° F.

Using 18 or 20 guage steel for the side wall, the slope provided by the dimensions given permits ready nesting of empty containers, with the tops swung back. As a result, if a truck loaded with live pheasants in containers stacked eight high, has deliveries to make at various points along the route, the empty containers accumulated upon local deliveries can be stacked to one side out of the way to such an extent that empties need never be unloaded en route to enable one to get to the full containers, the space occupied by two tiers of full containers being sufficient to accommodate empties from five or six tiers.

The use of opaque material for the top and bottom, and the use of perforate material in which the perforations constitute approximately half of the area for the side walls have significance. They cause the inside of the box to be somewhat dark, which has a quieting effect upon the birds inside.

Numerous variations in the construction of the containers of this invention, within the scope of the appended claims, will occur to those skilled in the art in the light of the foregoing disclosure. For example, a different hinging arrangement may be used, and different latching means. The shape of the container can be varied and the slope of the side wall. At the same time, a rectangular shape is preferred, and the slope is preferably only sufficient to ensure easy nesting of empty containers, that having been found sufficient to accomplish the other objects of the sloping. Plastic, particularly fiber glass reinforced plastic, or other materials, may be used for both top and sides, or any of them, so long as the material for the top is substantially opaque and the material for both top and sides is rigid and sufficiently strong to bear the load of at least three, filled, containers stacked on top. These are merely illustrative.

Having thus described the invention, what is claimed and desired to be secured by Letters Patent is:

1. A live game bird transporting device adapted to carry a multiplicity of birds, comprising a bird-restraining container including an enlarged, upper, bird body restraining and supporting portion and a lower, restricting, reduced, bird leg confining portion, said portions being perforate to provide ventilating means, said portions comprising a rigid, external load-supporting side wall, square in plan and trapezoidal in elevation, convergently slanted from top to bottom and defining an unobstructed interior space; an opaque, imperforate, rigid bottom connected to the reduced lower portion of said side wall; a load-supporting, rigid, opaque top mounted on said side wall and covering a top opening defined by said side wall, said top being moveable with respect to said side wall to provide access to the unobstructed interior of the container for placing birds therein and removing birds therefrom and to permit nested stacking of empty containers, and means for selectively releasing and securing said top for and against movement with respect to said side wall.

2. The device of claim 1 wherein the top and bottom are made of a material different from and having a greater heat insulative capacity than the side wall.

3. The device of claim 1 wherein the side wall is perforated steel sheet.

4. The device of claim 3 wherein the perforations constitute approximately one-half of the total area of the side wall.

5. The device of claim 1 wherein the top has downwardly directed ears which, when the top is in closing position, extend along, outboard of, and in engagement with the side wall whereby to inhibit outward springing of said side wall.

6. The device of claim 5 wherein the top is provided with latch means for cooperation with said side wall selectively to hold said top in closed position.

* * * * *